(12) United States Patent
Krupa

(10) Patent No.: US 6,915,304 B2
(45) Date of Patent: Jul. 5, 2005

(54) SYSTEM AND METHOD FOR CONVERTING AN XML DATA STRUCTURE INTO A RELATIONAL DATABASE

(76) Inventor: Kenneth A. Krupa, 278 E. 10th St., New York, NY (US) 10009

(*) Notice: Subject to any disclaimer, the term of this patent is extended or adjusted under 35 U.S.C. 154(b) by 293 days.

(21) Appl. No.: 09/863,794

(22) Filed: May 23, 2001

(65) Prior Publication Data

US 2002/0156811 A1 Oct. 24, 2002

Related U.S. Application Data

(60) Provisional application No. 60/206,325, filed on May 23, 2000.

(51) Int. Cl.[7] .......................... G06F 17/00; G06F 17/30
(52) U.S. Cl. ................... 707/102; 707/104.1; 707/200; 707/203
(58) Field of Search ............................. 707/102, 104.1, 707/200, 203, 3, 5

(56) References Cited

U.S. PATENT DOCUMENTS

| | | | | |
|---|---|---|---|---|
| 6,446,256 B1 | * | 9/2002 | Hyman et al. ............... | 717/143 |
| 6,584,459 B1 | * | 6/2003 | Chang et al. ................. | 707/3 |
| 6,711,590 B1 | * | 3/2004 | Lennon ....................... | 707/200 |
| 2001/0037345 A1 | * | 11/2001 | Kiernan et al. ............. | 707/513 |
| 2001/0047372 A1 | * | 11/2001 | Gorelik et al. .............. | 707/514 |
| 2001/0056429 A1 | * | 12/2001 | Moore et al. ............... | 707/101 |
| 2002/0010764 A1 | * | 1/2002 | Spicer ........................ | 709/220 |
| 2002/0116371 A1 | * | 8/2002 | Dodds et al. ................ | 707/3 |
| 2002/0123993 A1 | * | 9/2002 | Chau et al. .................. | 707/5 |

* cited by examiner

Primary Examiner—Luke Wassum
Assistant Examiner—Kuen S. Lu
(74) Attorney, Agent, or Firm—Mintz Levin Cohn Ferris Glovsky & Popeo, P.C.

(57) ABSTRACT

The present invention provides systems and methods for converting between an XML data structure and a relational database. It enables the storage of an XML document in such a way that: the relational data model would not have to change as the document model changes; the structure of the tables is set up in such a way that the entire document can be retrieved with a single query in a linear (i.e. non-recursive) fashion; and, information about specific individual components within an XML document can be retrieved via simple queries that do not require hierarchy traversals or intensive, post-query data parsing.

19 Claims, 6 Drawing Sheets

Figure 1 – XML Document Structure

FIG. 2. – XML Data Table With Sample Data.

| ID | SEQ | ANCESTORS | IMMEDIATE PARENT | DATA_NAME | DATA_TYPE | VALUE | EMPTY |
|---|---|---|---|---|---|---|---|
| 1 | 1 | customer | prolog | XML | PI | version="1.0" | 0 |
| 1 | 2 | customer | prolog | MyPI | PI | some PI data | 0 |
| 1 | 3 | customer | customer | type | attr | preferred | 0 |
| 1 | 4 | customer/name[1] | name | pcdata[1] | text | John Smith | 0 |
| 1 | 5 | customer/gender[1] | gender | pcdata[1] | text | male | 0 |
| 1 | 6 | customer/phone[1] | phone | type | attr | home | 0 |
| 1 | 7 | customer/phone[1] | phone | pcdata[1] | text | 516.555.1234 | 0 |
| 1 | 8 | customer/phone[2] | phone | type | attr | office | 0 |
| 1 | 9 | customer/phone[2] | phone | pcdata[1] | text | 212.555.1234 | 0 |
| 1 | 10 | customer/hobby[1] | hobby | name | attr | skiing | 1 |
| 1 | 11 | customer | epilog | | comment | This is the end of the document | 0 |

SYSTEM AND METHOD FOR CONVERTING AN XML DATA STRUCTURE INTO A RELATIONAL DATABASE

CROSS-REFERENCE TO RELATED PATENT APPLICATIONS

This application is a continuation-in-part of U.S. Provisional Patent application No. 60/206,325 filed May 23, 2000.

STATEMENT REGARDING FEDERALLY SPONSORED RESEARCH OR DEVELOPMENT

Not Applicable.

BACKGROUND OF THE INVENTION

The invention relates generally to the field of software technology and programming and more particularly to the representation and persistent storage of XML documents (or other programming objects that can be represented as XML documents) within a relational database.

Recent advances in software technology and the Internet are responsible for the proliferation of Extensible Markup Language (XML) as a standard for data representation. XML is a technology standard endorsed by the World-Wide-Web Consortium (W3C). Unlike HTML (the Internet standard for displaying information in a browser), which is concerned with the display and format of information, XML is concerned mostly with the structure of the data contained within a document (or other structured data object). For instance, a standard HTML web page contains instructions (or tags) that may instruct a browser to display a heading in bold font. An XML page on the other hand contains tags that allow a specialized browser (or other software) to know where the name of an author may be found within the contents of a document.

XML data is stored in XML documents. An XML document includes 3 main parts: a prolog, a body and an epilog. The prolog and epilog are considered optional parts of the document.

The prolog may include one or more processing instructions, a document type declaration, and one or more comments. The body of the document includes exactly one XML element known as the document element. In one of its simplest forms, an XML element includes a start tag, an end tag and some data therebetween. The epilog of the document may contain processing instructions and comments. Since the prolog and epilog are optional, the body represents the main content of the document.

The simple data contained between start and end tags that is not an element, processing instruction or comment is sometimes called a text node. A text node can be almost any string of characters provided it does not contain characters that would be confused with XML markup. To properly embed an XML parsing instruction in the text node without violating XML rules would require a CDATA section. CDATA sections are special text nodes that tell a parser to ignore any XML parsing instructions it may encounter within a text node.

XML is quickly becoming a standard way in which businesses exchange information electronically. This is due to the fact that XML is evolving into a behind-the-scenes data format for business-to-business data exchange. As a result of this business-to-business data exchange, programmers have extended the usage of XML beyond simply representation of document data. Programmers now find themselves using XML as way to structure data records and complex programming objects.

One example of such general purpose programming usage of XML is in Object Oriented (OO) programming. In Object Oriented programming languages (such as Java, C++ and Smalltalk), programmers can represent data as complex objects including one or more attributes. For instance, a customer object may include a name, gender and date-of-birth. In some cases, objects are made up of smaller objects. An example might be when a customer object includes a shipping address object, which in turn includes a street, city, state and zip code. Such information might also be represented as an XML document.

While the above is helpful in an abstract sense, this alternative representation of the data object only really begins to benefit the programmer when one considers storing the information on a more permanent basis. In general, programming objects are thought of as objects that exist in memory. Their true usefulness is only truly manifest when the information that the objects represent are stored permanently on dynamically accessible magnetic (or some cases, optical) media for later processing, such as on a computer hard drive. This process of storing programming object information on a more permanent basis is often referred to as object persistence.

Conventional computer software uses a variety of techniques to accomplish object (as well as general data) persistence. One of the most common techniques is the use of relational database technology. In an abstract sense, relational databases store objects as inter-related tables of information that are described by rows and columns (much like a spreadsheet). However, the representation of objects can become very complex when considering a relational database structure. While the benefit of the relational data model is in the ability of programmers to query the database to retrieve information about an attribute of an object, the more complicated the objects and the interrelationships become, the more complicated the relational data model becomes. This can increase the time it takes to write and test software.

Accordingly, it would be advantageous to provide techniques that would rely on a general data model for storage that does not change as the object model changes. It would be a further advantage to provide such techniques that employ XML.

One of the problems with the persistence of XML data in a relational database is that XML data is hierarchical in nature. Hierarchical information is inherently recursive. If this information is stored in a relational database, one might have to employ a recursive query algorithm to get an entire document. Recursive querying on a database can be a resource intensive process. Therefore it would be advantageous if a general technique could be devised to represent object data as XML in a relational database in such a way that would not require recursive querying while still maintaining the benefits of a general (non-changing) data model that still maintains the structure of the individual document components.

BRIEF SUMMARY OF THE INVENTION

An aspect of the invention provides a method of forming a relational database from an Extensible Markup Language (XML) document. The XML document includes multiple nodes. The method includes assigning an identifier to every node of the XML document and assigning a respective sequence identifier to each node of the XML document. The respective sequence identifiers identify an order of the nodes in the XML document. The method also includes converting each node of the XML document into a respective row of the relational database.

Another aspect of the invention provides a method of forming a relational database from an Extensible Markup Language (XML) document. The method includes assigning an identifier to the XML document and creating a row of the relational database that includes the identifier, and content of one of the plurality of nodes that makes up the XML document.

Yet another aspect of the invention provides a relational database. The database includes a row containing content from a node of an Extensible Markup Language (XML) document. The row also includes an XML document identifier.

The invention will next be described in connection with certain illustrated embodiments and practices. However, it will be clear to those skilled in the art that various modifications, additions and subtractions can be made without departing from the spirit or scope of the claims.

BRIEF DESCRIPTION OF THE FIGURES

The invention will be more clearly understood by reference to the following detailed description of an exemplary embodiment in conjunction with the accompanying drawings, in which.

DETAILED DESCRIPTION OF THE INVENTION

The present invention provides system and method for converting between an XML data structure and a relational database.

Figure 1:
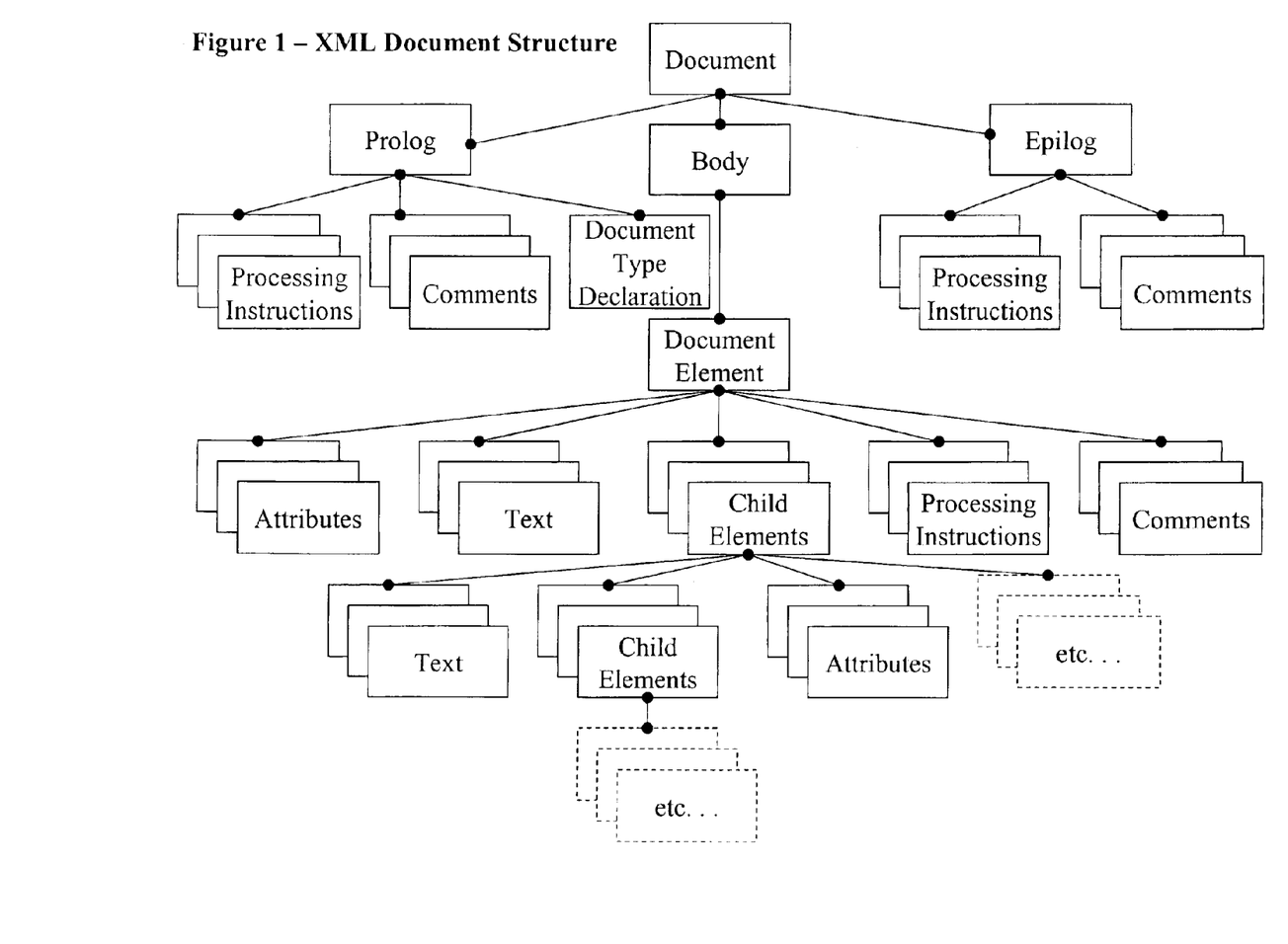
FIG. 1 is a graphical depiction of an in-memory XML document structure.

FIG. 1 is a graphical depiction of an XML document structure. One way in which XML document data can be represented is as an in-memory XML document tree. What this means is that the data is stored in memory with all of the parent-child relationships intact.

A programming model that supports an in-memory representation such as the one depicted in FIG. 1, would provide methods to traverse the hierarchy of the tree programmatically. Conventional methods exist in the form of Document Object Models (DOM). The W3C defines a standard DOM for XML processing (www.w3c.org/DOM which is incorporated herein by reference as if fully set forth). In addition, there exist variations on the W3C DOM, such as JDOM™ (described at www.jdom.org which is incorporated herein by reference as if fully set forth), which is another in-memory XML processing model geared towards Java™ programmers. In both cases, the model is object oriented implying that the programmatic representation is more easily implemented in an object oriented programming language such as Java or C++. For the purposes of the present invention, any suitable DOM implementation could be employed to access to the XML document.

Relational data is stored as rows of information where (in most cases) each row is uniquely identified by a certain unique key. A unique key unambiguously identifies an individual data component (or set of related components) within a certain context. On the surface, it would appear that XML does not have such a mechanism for its data components when each component is considered independently. When considered within the context of an entire document, however, it is possible to devise a scheme for mapping a unique key to each data component. The algorithm below describes such a technique. The technique below applies to elements, attributes and text (including CDATA sections) since those are the components that make up the true data components of an XML document. When the XML unique key mapping is applied to an actual database table later in this document, the algorithm will be extended to include other miscellaneous items such as processing instructions and comments. The following is an example of a simple customer object represented as an XML document:

```
<?XML version="1.0"?>
<customer type="preferred">
    <name>John Smith</name>
    <gender>male</gender>
    <phone type="home">516.555.1234</phone>
    <phone type="office">212.555.1234</phone>
    <hobby name="skiing"/>
</customer>
```

Ignoring for a moment the XML processing instruction, in this example, customer is the name of the document element. It is further described by an attribute named type and, in turn, contains child elements named name, gender, phone (2 instances) and hobby. Each of the child elements contain single text nodes and each of the phone elements also contain attributes (also named type). This example also includes an empty element (hobby). An empty element is a special type of element that cannot contain any child nodes (text, elements, processing instructions or comments). If an empty element is to contain anything at all, it will contain attributes only. In the example above, the hobby element is an example of an empty element.

In the above example the element and attribute names are not unique identifiers. If the document is studied as a whole, however, a form of unique identifier could be defined for each data item if the name of each ancestor element is remembered as the tree is traversed. For example:

| Name | Value |
|---|---|
| customer/type/pcdata | preferred |
| customer/name/pcdata | John Smith |
| customer/gender/pcdata | male |

In the above example, the hierarchy was traversed in a top-down-left-right order and each element name was remembered along the way so that each relevant element name was used to uniquely describe any data components encountered. When either a text node or an attribute was reached, the data name was fully described. For regular text nodes, the descriptor pcdata (an XML term for parsed character data) was used. For attributes, the attribute name itself was used. If a CDATA section had been encountered, the descriptor cdata would have been used instead of pcdata.

Using this scheme it is possible to differentiate between like named attributes (such as type in the above example). To handle repeating elements (such as phone), the mapping will be extended further as in the following example:

| Name | Value |
|---|---|
| customer/type | preferred |
| customer/name[1]/pcdata[1] | John Smith |
| customer/gender/pcdata | male |
| customer/phone[1]/type | home |
| customer/phone[1]/pcdata[1] | 516.555.1234 |
| customer/phone[2]/type | office |

-continued

| Name | Value |
|---|---|
| customer/phone[2]/pcdata[1] | 212.555.1234 |
| customer/hobby[1]/name | skiing |

In the above example, numeric qualifiers have been added to any item that has the possibility of repeating within an element. This excludes the document element itself as well as all attribute names. The reason is that each is guaranteed to be unique within their respective contexts. Specifically, there is but one document element per XML document instance and, all attribute names must be unique within the context of a given element.

Text nodes have also been numerically qualified. The reason is that XML supports what is known as mixed element content. What this means is that text items and elements can be interspersed within a given parent element. Consider the following example: <paragraph>Please consult the document<reference>A document name</reference>for a complete description</paragraph>

In the preceding XML fragment, the element paragraph includes 2 text nodes and a single element node named reference. Since there are 2 text nodes, there would need to be mappings for . . . /paragraph/pcdata[1] and . . . /paragraph/pcdata[2] which refer to the text appearing to the left and right of the reference element respectively. While such usage is rare in data object modeling, the possibility must be accounted for, for purposes of completeness.

Now that the basic mechanism for uniquely describing XML data items has been described, the complete storage solution shall be described. To do so, the sample XML document will be augmented.

```
<?XML version="1.0"?>
<?MyPI "some PI data"?>
<customer type="preferred">
    <name>John Smith</name>
    <gender>male</gender>
    <phone type="home">516.555.1234</phone>
    <phone type="office">212.555.1234</phone>
    <hobby name="skiing"/>
</customer>
<!-- this is the end of the document -->
```

Figure 2:
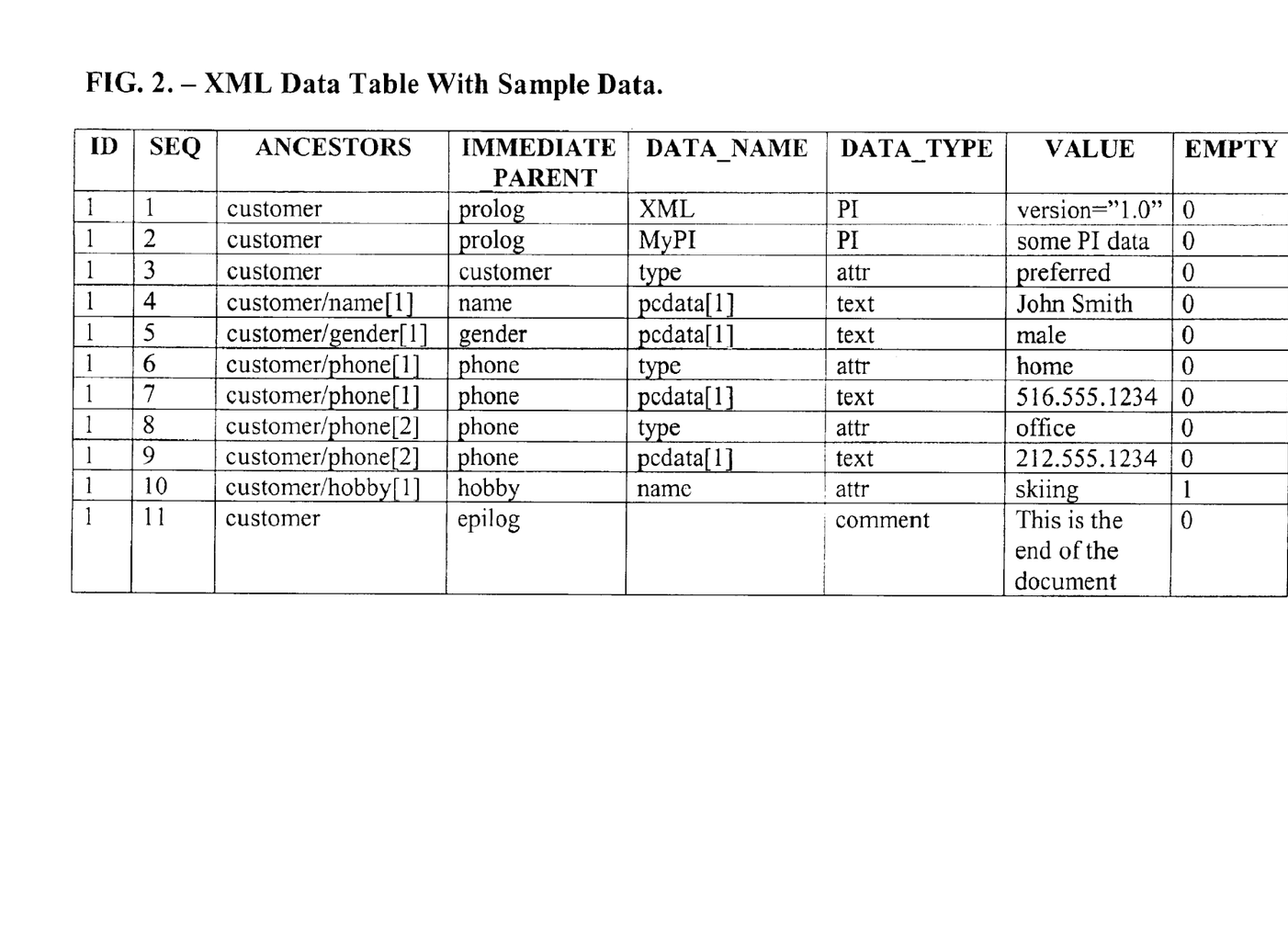
FIG. 2 is an XML data table showing sample data.
Figure 3:
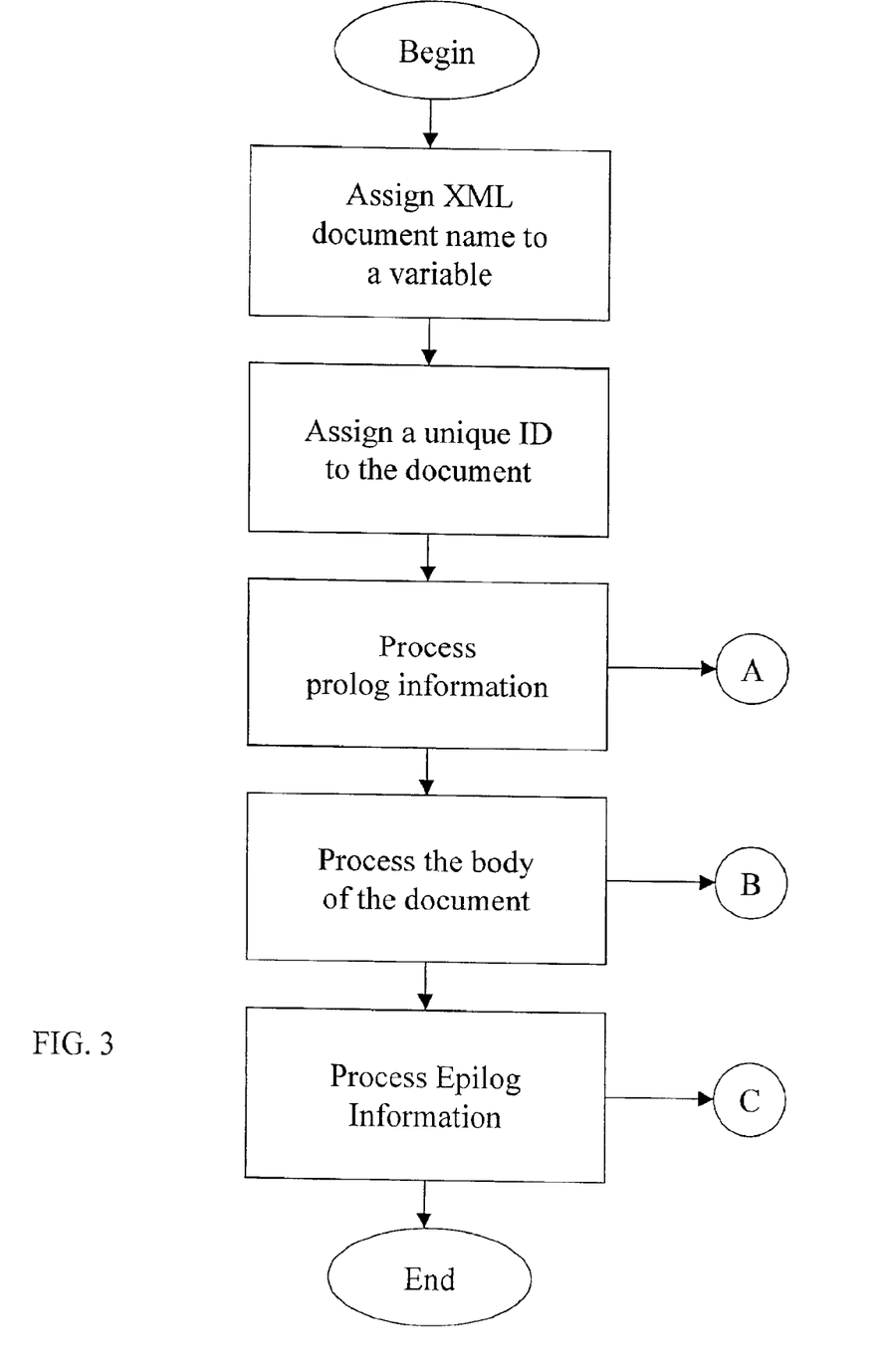
FIG. 3 is a flow chart of the invention.
Figure 4:
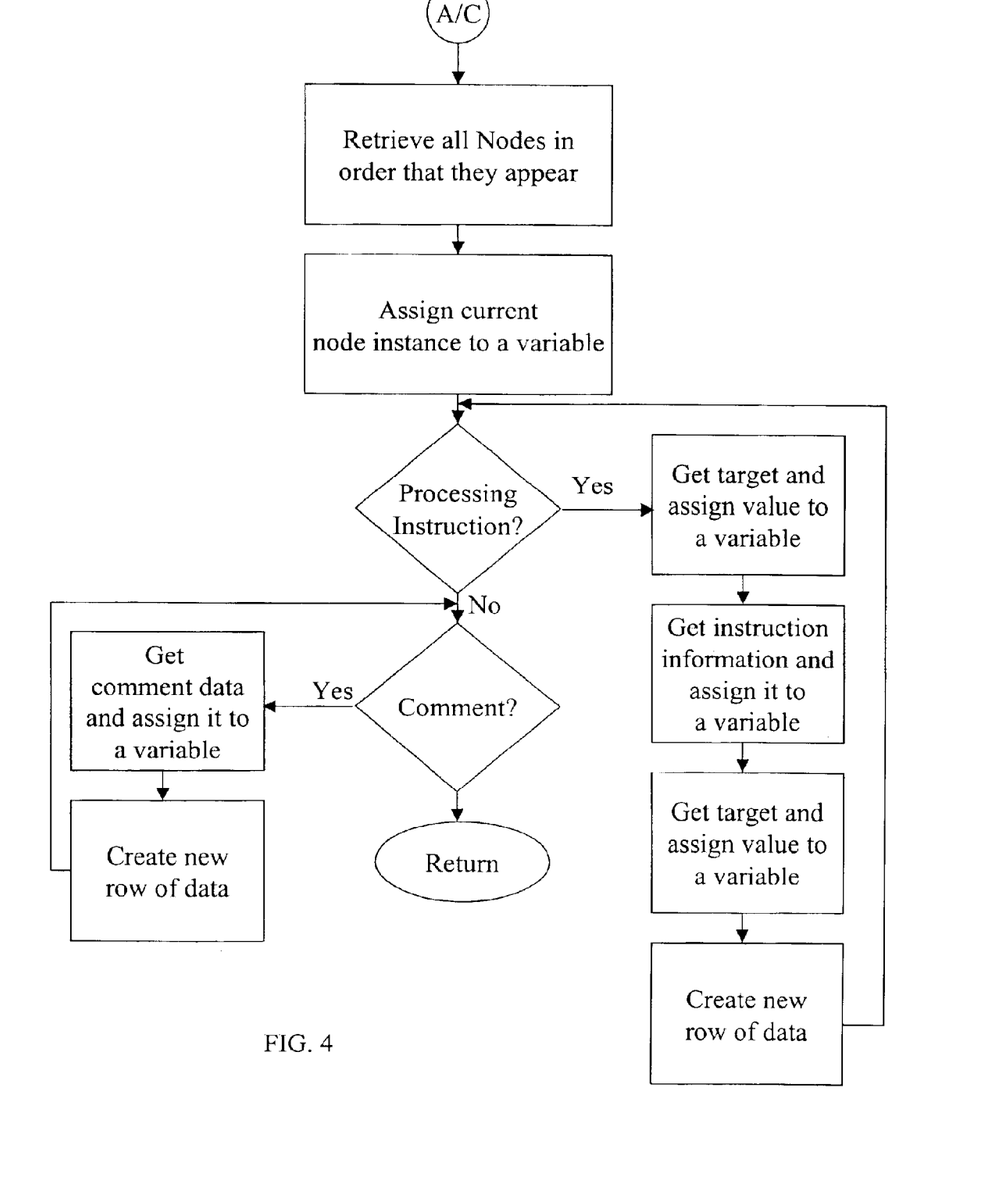
FIG. 4 is another flow chart illustrating a portion of the flow chart of FIG. 3 in more detail.
Figure 5:
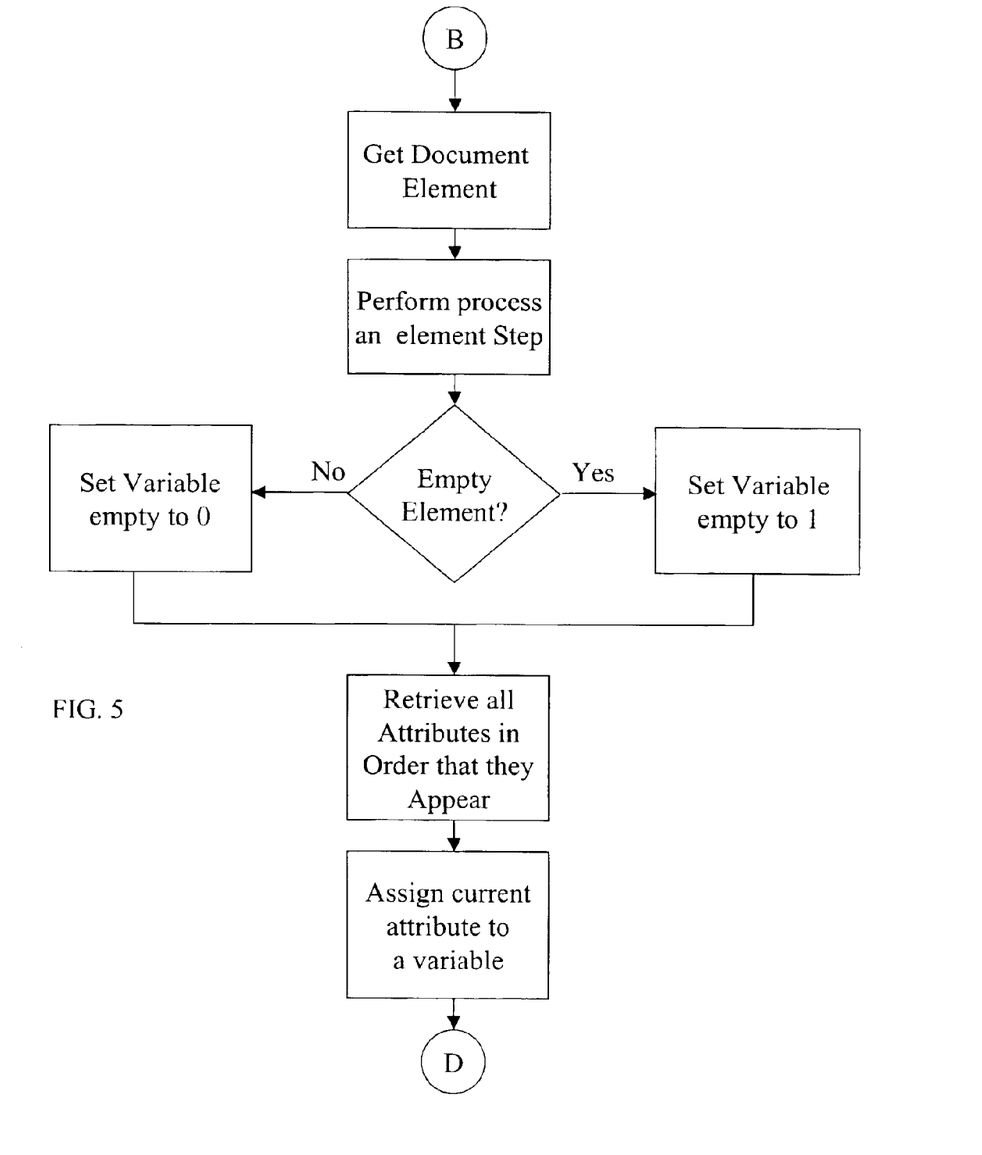
FIGS. 5 and 5A are another flow chart illustrating another portion of the flow chart of FIG. 3 in more detail.
Figure 5A:
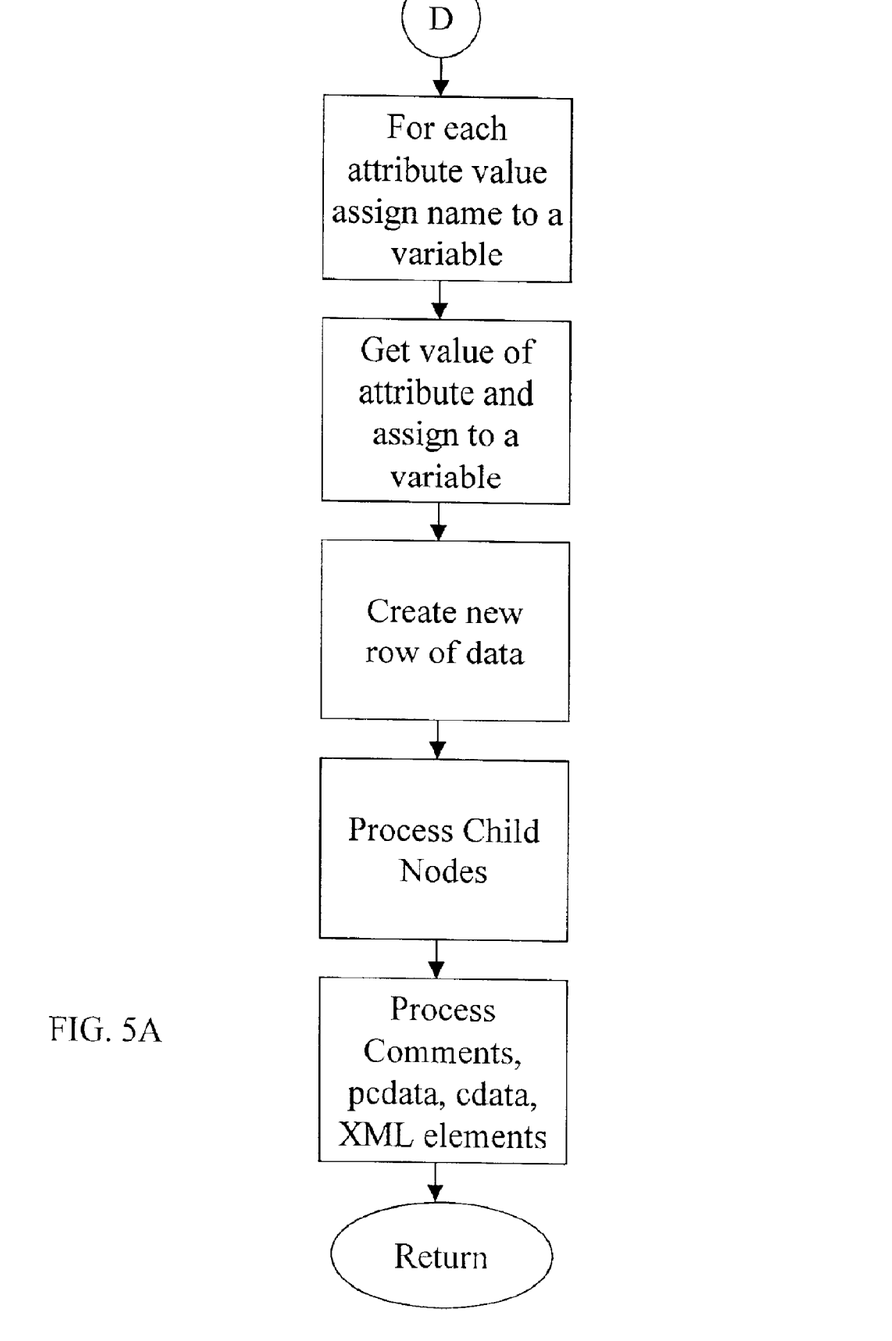

Using the above example and applying the XML mapping scheme with some augmentation, we arrive at the table data illustrated in FIG. 2.

Before discussing the details of each row of data it may be helpful first to understand what each column of the table represents.

ID: This is the id associated with the XML document instance. All of the rows of data that correspond to a particular document instance will have the same id. This would imply that, in addition to the table above, there may also be a "master document" table containing one row per document which would contain information pertaining to the document as a whole. Such a table would be considered a parent table to the table above.

SEQ: This is a counter used for ordering the data components of the XML document instance. The sequence will ensure that the document data is stored in the order that it should appear if doing a top-down-left-right traversal.

ANCESTORS: This is the unique XML data mapping excluding only the last part (which is broken out and stored in the data_name column).

IMMEDIATE_PARENT: This is the unqualified immediate parent element name. In the case of prolog and epilog information, the words prolog and epilog are used respectively.

DATA_NAME: This is the last portion of the XML data mapping. It will contain one of an attribute name, a numerically qualified text name (either pcdata or cdata) with the counter unique within text type, the target name of a processing instruction node (with no numeric qualification needed) or a null value if the node is a comment node.

DATA_TYPE: Specifies the type of data node as attr for attributes, text for pcdata and cdata nodes, PI for processing instructions and comment for comments.

VALUE: This column will contain the value of the attribute, text data or comment. If the node is a processing instruction, the column will contain the instruction information.

EMPTY: This only applies to attribute rows and will be set to 1 if the attribute is part of an empty element, otherwise it will be set to zero. If the database being used supports Boolean data types, the Boolean values true and false may also be used instead of 1 and 0 respectively.

Turning back to the example data in FIG. 2., the prolog information appears first, followed by the body data and lastly, the epilog information. Also, all of the data in the table appears in substantially the same order that it appears in the document. A simple SQL query for a given document id that orders the data by sequence number (the seq column) will result in the retrieval of all of the data necessary to produce an in-memory XML tree.

Each data component is also stored in its own row of data, providing an efficient mechanism for retrieving certain components of the XML document without having to retrieve the whole document itself.

The Storage Algorithm

Given the technique illustrated above, coupled with an in-memory XML API (application programming interface) such as the W3C DOM or JDOM, the storage algorithm becomes fairly straightforward.

The following pseudo-code demonstrates a technique for a given in-memory XML document instance:

1. Get the document name. This is the same as the document element name. Assign the document name to a variable docName.
2. Assign the document a unique numeric ID called docId. This variable will be treated as a global variable in the context of this pseudo-code in that it will never get reset, even when a recursive subroutine call is made.
3. Initialize a sequence counter as follows: sequence :=0. This variable will also be treated as a global variable in the context of this pseudo-code in that it will never get reset, even when a recursive subroutine call is made.
4. Process the prolog information, if any.
    4.1. Retrieve all nodes in the prolog in the order that they appear. This will include all processing instructions and comments. Exclude for the moment, the document type description.
    4.2. Loop through all retrieved node instances. Assign the current node instance to a local variable called node. For each value of node do the following:
        4.2.1. Increment the sequence counter as follows: sequence++
        4.2.2. If node is a processing instruction do the following:
            4.2.2.1. Get the target of the processing instruction and assign the value to a variable called target.
            4.2.2.2. Get the instruction information of the processing instruction and assign it to a variable called instruction.
            4.2.2.3. Create a new row of data with the following column assignments:

```
ID := docId
SEQ := sequence
ANCESTORS := docName
IMMEDIATE_PARENT := "prolog"
DATA_NAME := target
DATA_TYPE := "PI"
DATA_VALUE := instruction
EMPTY := 0
```

4.2.3. If node is a comment, do the following:
    4.2.3.1. Get the comment data (the information between the delimiters) and assign it to the variable commentData.
    4.2.3.2. Create a new row of data with the following column assignments:

```
ID := docId
SEQ := sequence
ANCESTORS := docName
IMMEDIATE_PARENT := "prolog"
DATA_NAME := null
DATA_TYPE := "comment"
DATA_VALUE := commentData
EMPTY := 0
```

5. Process the body of the document.
   5.1. Get the document element
   5.2. Perform the "process an element" step using the document element for the value of the parameter XmlElement and docName for the value of ancestors.
   5.3. Process an element. This is a repeatable routine, which accepts, as parameters, an XML element and a previous ancestor sequence as the following variables, respectively: XmlElement, ancestors.
      5.3.1. Get the name of XmlElement as the variable parent.
      5.3.2. Interrogate XmlElement to see if it is an empty element. If so set the variable, empty to 1, otherwise set it to 0.
      5.3.3. Retrieve all attributes of XmlElement in the order that they appear.
      5.3.4. Loop through all retrieved attributes. Assign the current attribute to a variable called attribute. For each value of attribute do the following:
         5.3.4.1. Increment the sequence counter as follows: sequence++
         5.5.3.4.2. Get the name of the attribute and assign it to a variable attributeName.
         5.3.4.3. Get the value of the attribute (i.e. the data associated with it) and assign it to a variable called attributeValue.
         5.3.4.4. Create a new row of data with the following column assignments:

```
ID := docId
SEQ := sequence
ANCESTORS := ancestors
IMMEDIATE_PARENT := parent
DATA_NAME := attributeName
DATA_TYPE := "attr"
DATA_VALUE := attributeData
EMPTY := empty
```

5.3.5. Initialize a new hash table of counters in preparation for child node processing. This table will start out with no values but, during child node processing, will be used to store counters corresponding to each unique child element node name, pcdata instance and/or cdata instance encountered. As instances of each are encountered, counters will be kept for each for purposes of proper numerical qualification. Counters are not needed for processing instructions or comments.
      5.3.6. Retrieve all child nodes of XmlElement in the order in which they appear.
      5.3.7. Loop through all retrieved child node instances. Assign the current node instance to a local variable called node. For each value of node do the following:
         5.3.7.1. Increment the sequence counter as follows: sequence++
         5.3.7.2. If node is a processing instruction do the following:
            5.3.7.2.1. Get the target of the processing instruction and assign the value to a variable called target.
            5.3.7.2.2. Get the instruction information of the processing instruction and assign it to a variable called instruction.
            5.3.7.2.3. Create a new row of data with the following column assignments:

```
ID := docId
SEQ := sequence
ANCESTORS := ancestors
IMMEDIATE_PARENT := parent
DATA_NAME := target
DATA_TYPE := "PI"
DATA_VALUE := instruction
EMPTY := 0
```

5.3.7.3. If node is a comment, do the following:
            5.3.7.3.1. Get the comment data (the information between the delimiters) and assign it to the variable commentData.
            5.3.7.3.2. Create a new row of data with the following column assignments:

```
ID := docId
SEQ := sequence
ANCESTORS := ancestors
IMMEDIATE_PARENT := parent
DATA_NAME := null
DATA_TYPE := "comment"
DATA_VALUE := commentData
EMPTY := 0
```

5.3.7.4. If node is a pcdata text type, do the following:
            5.3.7.4.1. Get the text associated with the node and assign it to a variable called textData.
            5.3.7.4.2. Interrogate the hash table described in step 5.3.5. If this is the first such pcdata item encountered, a new counter value (of 1) will be placed in the hash table for pcdata nodes. If this is not the first pcdata item encountered for the current parent element, then the existing counter will be incremented. In either case, assign the resultant counter value to a local variable called textCount.

5.3.7.4.3. Create a new row of data with the following column assignments:

```
ID := docId
SEQ := sequence
ANCESTORS := ancestors
IMMEDIATE_PARENT := parent
DATA_NAME := "pcdata[" + textCount + "]"
DATA_TYPE := "text"
DATA_VALUE := textData
EMPTY := 0
```

5.3.7.5. If node is a cdata text type, do the following:
5.3.7.5.1. Get the text associated with the node and assign it to a variable called cdataTextData.
5.3.7.5.2. Interrogate the hash table described in step 5.3.5. If this is the first such cdata item encountered, a new counter value (of 1) will be placed in the hash table for cdata nodes. If this is not the first cdata item encountered for the current parent element, then the existing counter will be incremented. In either case, assign the resultant counter value to a local variable called cdataCount.
5.3.7.6. Create a new row of data with the following column assignments:

```
ID := docId
SEQ := sequence
ANCESTORS := ancestors
IMMEDIATE_PARENT := parent
DATA_NAME := "cdata[" + cdataCount + "]"
DATA_TYPE := "text"
DATA_VALUE := cdataTextData
EMPTY := 0
```

5.3.7.7. If node is an XML element, do the following:
5.3.7.7.1. Get the name of node and assign it to a variable called elemName.
5.3.7.7.2. Interrogate the hash table described in step 5.3.5. If this is the first such instance of elemName encountered for the current parent element, a new counter value (of 1) will be placed in the hash table for nodes named elemName. If this is not the first item named elemName encountered for the current parent element, then the existing counter will be incremented. In either case, assign the resultant counter value to a local variable called elemCount.
5.3.7.7.3. Create a variable called newAncestor and set it to a concatenated value as follows: newAncestor :=ancestor+"/"+elemName+"["+ elemCount+"]".
5.3.7.7.4. Recursively call the subroutine outlined in step 5.3 using node as the value for XmlElement and newAncestor as the value for ancestors.
6. Process the epilog information, if any.
6.1. Retrieve all nodes in the epilog in the order that they appear. This will include all processing instructions and comments.
6.2. Loop through all retrieved node instances. Assign the current node instance to a local variable called node. For each value of node do the following:
6.2.1. Increment the sequence counter as follows: sequence++
6.2.2. If node is a processing instruction do the following:
6.2.2.1. Get the target of the processing instruction and assign the value to a variable called target.
6.2.2.2. Get the instruction information of the processing instruction and assign it to a variable called instruction.
6.2.2.3. Create a new row of data with the following column assignments:

```
ID := docId
SEQ := sequence
ANCESTORS := docName
IMMEDIATE_PARENT := "epilog"
DATA_NAME := target
DATA_TYPE := "PI"
DATA_VALUE := instruction
EMPTY := 0
```

6.2.3. If node is a comment, do the following:
6.2.3.1. Get the comment data (the information between the delimiters) and assign it to the variable commentData.
6.3. Create a new row of data with the following column assignments:

```
ID := docId
SEQ := sequence
ANCESTORS := docName
IMMEDIATE_PARENT := "epilog"
DATA_NAME := null
DATA_TYPE := "comment"
DATA_VALUE := commentData
EMPTY := 0
```

The Retrieval Algorithm

As mentioned, the mechanism for document retrieval may be performed with a single linear SQL query to obtain all of the information for a particular document from the database. Since all of the data items are in order, an in-memory XML tree can easily be reconstructed by interrogating each data row and creating the appropriate object that corresponds to the data row.

The pseudo-code below is an example of such a retrieval algorithm. As will the storage algorithm, an appropriate DOM is used for creating the in-memory XML tree.

1. Select all data from the database via a standard SQL query as follows:

```
select * from XML_DATA_TABLE
where ID = 1
order by SEQ
```

The above query assumes that the table XML_DATA_TABLE has been named and that an XML document with an ID of 1 is the subject of the search. Note that we order by the SEQ column to ensure that the data appears in the proper order.
2. Create a document object and call it document.
3. Process the prolog information (retrieved first) and create corresponding processing instruction and comment objects based on the row information.
4. Process document element information.
4.1. Create a single element object (for the document element) and call it curr_element.

4.2. Begin processing the document element data. This will continue until the epilog information is encountered. The processing of the document element data relies on the fact that the information appears in top-down-left-right traversal order and that all items with the same ANCESTOR value are children of the same element. The value of curr_element will change as we nest deeper into the hierarchy (according to the value of ANCESTOR). New element objects (for the value of curr_element) are created as needed and attached to the current element being processed. A stack may be used to account for the many levels of nesting that may be encountered (the top-down-left-right traversal implies a possible need to work back up the hierarchy during traversal in some cases). As for the creation of the attached objects themselves, the data type will dictate the appropriate object to create (e.g. attribute, element, comment, processing instruction).

5. Process all of the epilog information and create corresponding instruction and comment objects based on the row information retrieved.

Alternate Embodiments

Elements with no data: In all of the examples presented above, the XML document components stored in the database all contained some piece of associated data. This makes sense since XML is a data-centric language. In some rare cases, however, it is sometimes desirable to store an element with no data associated with it. Such an example is an empty element that contains no attributes. In such a case, the mere existence of the element in the markup has some meaning and implication in the associated document. In such a case, one could modify the above algorithm to allow for the storage of elements with no data contained in them by doing the following:

1. Define a new DATA_TYPE called "elem".
2. If an empty element is encountered, create a row similar to an attribute row, but with a null DATA_NAME, a null DATA_VALUE and the value of "elem" for DATA_TYPE.

Minimizing the ancestor specification: an examination of the data in the sample table (FIG. 2), illustrates that the reference to "customer" appears at the beginning of every data item in the ANCESTOR column. The reason is that this is the name of the one and only document element of the XML document. Since this information is at the document level, it could be non-redundantly stored in a parent table (such as the one mentioned in the ID column).

Doctype declaration storage and other document level information: since the document type declaration is also document level data, it may also be stored in a parent table. Since the document type declaration does not contain specific document instance data, it is not important within the context of this invention and can simply be stored as a single contiguous text stream in the parent table.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall there between.

Having described the invention, what is claimed is:

1. A method of forming a relational database from an Extensible Markup Language (XML) document formed of a plurality of nodes, the method comprising:

assigning an identifier to every node of the XML document, wherein the identifier identifies the XML document against another XML document;

assigning a respective sequence identifier to each node of the XML document; wherein said respective sequence identifiers identify an order of the nodes in the XML document; and, converting each node of the XML document into a respective row of the relational database.

2. The method according to claim 1 wherein said converting comprises:

processing a prolog of the XML document if one is present;

subsequent to the processing the prolog, processing a body of the XML document; and, subsequent to processing the body, processing an epilog of the XML document if one is present.

3. The method according to claim 2 wherein:

processing the prolog includes:

retrieving a node from the prolog;

determining a type for the node;

subsequent to a determination that the node type is a processing instruction:

determining a target for the node;

determining an instruction for the node; and, creating a row of the relational database that includes the identifier, the sequence identifier for the node, an XML document name, the target, the node type, and the instruction; and, subsequent to a determination that the node type is a comment:

determining the comment; and, creating a row of the relational database that includes the identifier, the sequence identifier for the node, an XML document name, the comment, and the node type.

4. The method according to claim 3 further including incrementing the sequence identifier subsequent to creating the row of the relational database and repeating.

5. The method according to claim 2 wherein:

processing the epilog includes:

retrieving a node from the epilog;

determining a type for the node;

subsequent to a determination that the node type is a processing instruction:

determining a target for the node;

determining an instruction for the node; and, creating a row of the relational database that includes the identifier, the sequence identifier for the node, an XML document name, the target, the node type, and the instruction; and, subsequent to a determination that the node type is a comment:

determining the comment; and, creating a row of the relational database that includes the identifier, the sequence identifier for the node, an XML document name, the comment, and the node type.

6. The method according to claim 5 further including incrementing the sequence identifier subsequent to creating the row of the relational database.

7. The method according to claim 2 wherein:

processing the body includes:

retrieving an XML element;

determining if the element is empty;

setting an empty element variable to a value based upon the determination; and, creating a row of the relational database that includes the identifier, the sequence identifier for the node, and attributes of the element; and, incrementing the sequence identifier subsequent to creating the row of the relational database.

8. The method according to claim 7 wherein the attributes of the element include:

an element name, an attribute type, and an attribute value.

9. The method according to claim 7 wherein the row further includes the value of the empty element variable, an ancestor and a parent.

10. The method according to claim 7 further comprising:

retrieving another element;

determining a type for the another element;

subsequent to a determination that the element type is a processing instruction:

determining a target for the element;

determining an instruction for the element; and, creating a row of the relational database that includes the identifier, the sequence identifier for the node, and element name, the target, the element type, and the instruction;

subsequent to a determination that the element type is a comment:

determining text of the comment; and, creating a row of the relational database that includes the identifier, the sequence identifier for the node, an element name, the comment, and the element type; and subsequent to a determination that the element type is a pcdata text:

determining how many times this element type has been encountered;

determining text of the pcdata text; and, creating a row of the relational database that includes the identifier, the sequence identifier for the node, an element name, the element type, an indication of the number of times this element type has been encountered, and the text; and, subsequent to a determination that the element type is a cdata text:

determining how many times this element type has been encountered;

determining text of the cdata text; and, creating a row of the relational database that includes the identifier, the sequence identifier for the node, an element name, the element type, an indication of the number of times this element type has been encountered, and the text, wherein the sequence identifier is incremented each time a row of the relational database is created.

11. A method of forming a relational database from an Extensible Markup Language (XML) document formed of a plurality of nodes, the method comprising:

assigning an identifier to the XML document, wherein the identifier identifies the XML document against another XML document; and, creating a row of the relational database that includes the identifier, and a content of one of the plurality of nodes.

12. A relational database comprising:

a database that includes a row containing, content from a node of an Extensible Markup Language (XML) document;

wherein the row includes an XML document identifier that identifies the XML document against another XML document.

13. The relational database according to claim 12 wherein said content includes:

a sequence identifier for the node, an XML document name, a processing instruction, a target of the processing instruction, and a node type.

14. The relational database according to claim 12 wherein said content includes:

a sequence identifier for the node, an XML document name, a comment, and a node type.

15. The relational database according to claim 12 wherein said content includes:

a sequence identifier for the node, and XML element attributes.

16. The relational database according to claim 15 wherein said element attributes include:

an element name, an attribute type, and an attribute value.

17. The relational database according to claim 12 wherein said content includes:

a sequence identifier for the node, an element name, an element type, an indication of the number of times this element type has been encountered, and a text of the element.

18. The relational database according to claim 17 wherein said element type is pcdata.

19. The relational database according to claim 17 wherein said element type is cdata.

* * * * *